US006144465A

United States Patent [19]
Hayashi

[11] Patent Number: 6,144,465
[45] Date of Patent: Nov. 7, 2000

[54] GUIDING MECHANISM FOR SLIDABLE MOVEMENT OF A CARRIER IN AN IMAGE PROCESSOR

[75] Inventor: Eiichi Hayashi, Ohmiya, Japan

[73] Assignee: Fuji Photo Optical Co., Ltd., Japan

[21] Appl. No.: 09/038,735

[22] Filed: Mar. 11, 1998

[30] Foreign Application Priority Data

Mar. 11, 1997 [JP] Japan .................................. 9-072796

[51] Int. Cl.[7] ................................ H04N 1/04
[52] U.S. Cl. ................................ 358/474
[58] Field of Search ................................ 358/474, 497, 358/494, 498, 506, 487

[56] References Cited

U.S. PATENT DOCUMENTS

| | | | |
|---|---|---|---|
| 4,367,945 | 1/1983 | Abe | 355/51 |
| 4,634,261 | 1/1987 | Nagoshi | 355/8 |
| 4,931,836 | 6/1990 | Matsushita et al. | 355/233 |
| 5,250,930 | 10/1993 | Yoshida | 345/168 |
| 5,760,924 | 6/1998 | Takahara et al. | 358/497 |
| 6,002,900 | 12/1999 | Ishiyama | 399/149 |

*Primary Examiner*—Jerome Grant, II
*Attorney, Agent, or Firm*—Price, Heneveld, Cooper, DeWitt & Litton

[57] ABSTRACT

An improved guiding mechanism is disclosed for slidable movement of carriers in an image processor having guide means provided internally of a main body of the image processor on which the carriers are slidably moved to scan an original and thereby read an image represented on the original. A synthetic resin is employed to form both a top surface of the guide means and surfaces of the carriers destined to come in contact with the guide means in order to minimize vibration otherwise generated by the carriers during their slidable movement. A housing for the image processor is provided on transversely opposite side walls with guide means on which a guide plate made of lubricating synthetic resin is laminated. Pedestals mounted on legs and of the respective carriers and so as to come in contact with the guide means, are made of oleo-synthetic resin such as oleo-polyacetal. The carriers are slidably moved with the help of the contact between the surfaces made of synthetic resin which generate a frictional force substantially lower than the case in which the carriers are slidably moved on a surface made of metallic material. In this way, the carriers can be smoothly moved without vibration.

7 Claims, 8 Drawing Sheets

GUIDING MECHANISM FOR SLIDABLE MOVEMENT OF A CARRIER IN AN IMAGE PROCESSOR

BACKGROUND OF THE INVENTION

1. Field of the Invention

This invention relates to an image processor used in copying machines, printers, scanners or the like, to read an original image represented on a paper sheet or the like, and to subject this image to various processes, and more particularly, to an improved guiding mechanism for slidable movement of the carrier scanning the original.

2. Description of the Related Art

Conventional image processors typically include a carrier to pick up an image to be processed from an original and to direct it to an image processing unit such as a CCD. To carry out this function, the carrier includes various optical elements such as reflectors, which form an optical path extending from the original to the CCD. The carrier is driven to scan the original and thereby to pick up the image to be processed. The carrier is driven in operative association with a length of wire adapted to be taken up on a pulley that is rotatably driven by an electric motor. The carrier is placed on guide means horizontally extending within a main body of the image processor and slidably moves on the guide means. To guide such slidable movement of the carrier, the carrier is provided with pedestals of which the distal ends come in slidable contact with the guide means.

However, the guiding mechanisms of this type disadvantageously vibrate due to the slidable movement of the carrier since the guide means is made of the same metallic material as the main body of the image processor and the carrier also may be affected by this vibration. As a result, the original image picked up by the carrier may be distorted. To overcome this problem, it is well known to provide a magnet on the carrier properly spaced from the guide surface of the guide means so as to alleviate the vibration of the carrier.

However, mounting a magnet on the carrier generates a magnetic force directed orthogonal to the direction in which the carrier is slidably moved and consequently such magnetic force may resist the slidable movement of the carrier. In addition, this countermeasure inevitably increases the number of parts.

SUMMARY OF THE INVENTION

In view of the problems described above, it is a principal object of the invention to provide a guiding mechanism for slidable movement of a carrier in an image processor so improved that a slidable movement of the carrier is free from vibration without requiring that a magnet be provided on the carrier.

To achieve this and other aspects and advantages, the image processor of the present invention, comprises: a main body; an image processing unit for processing a unit of a scanned original; the carrier being movable from an initial position to a predetermined position in order to scan the original and thereby to direct an image of the original to the image processing unit, the carrier including at least one pedestal having a contacting surface; and guide means provided internally of the main body and having a top surface for contacting the contacting surface of the pedestal and thereby allowing the carrier to be slidably moved thereon from the initial position to the predetermined position so that the carrier may scan the original, wherein any one of the top surface of the guide means and the contacting surface of the pedestal is made of synthetic resin.

According to one embodiment of the present invention, both the top surface of the guide means and the contacting surface of the pedestal is made of synthetic resin. The contact between the top surface of the guide means and the pedestals occurs through a contact between the surfaces both made of synthetic resin. As a consequence, the frictional force generated is lower than the case in which the contact surfaces are both made of metallic material and the carriers can be smoothly moved practically without vibration.

To further reduce said frictional force, one of the contacting surface of the pedestal and the top surface of the guide means is made of oleo-synthetic resin and the other is made of lubricating synthetic resin. By defining the contacting surfaces by a combination of surfaces made of oleo-synthetic resin and of lubricating synthetic resin, the frictional force generated between the contacting surfaces can be further reduced and the carriers can be more smoothly moved without vibration. A preferred material for the contacting surface of the pedestal is made of oleo-polyacetal.

The guide means are generally provided within a metallic housing for the carriers and therefore are often formed integrally with the housing. In this case, only the contacting surface of each pedestal is made of synthetic resin. Contact between the surface made of metallic material and the surface made of synthetic resin generates a frictional force lower than that where the contacting surfaces are both made of metallic material. Correspondingly, the carriers can be more smoothly moved without vibration during their slidable movement.

These and other features, advantages and objects of the present invention will be further understood and appreciated by those skilled in the art by reference to the following specification, claims and appended drawings.

DETAILED DESCRIPTION OF THE EMBODIMENTS

Details of the inventive guiding mechanism for slidable movement of the carrier in the image processor will be more fully understood from the description of preferred embodiments given hereunder in reference with the accompanying drawings.

Figure 2:
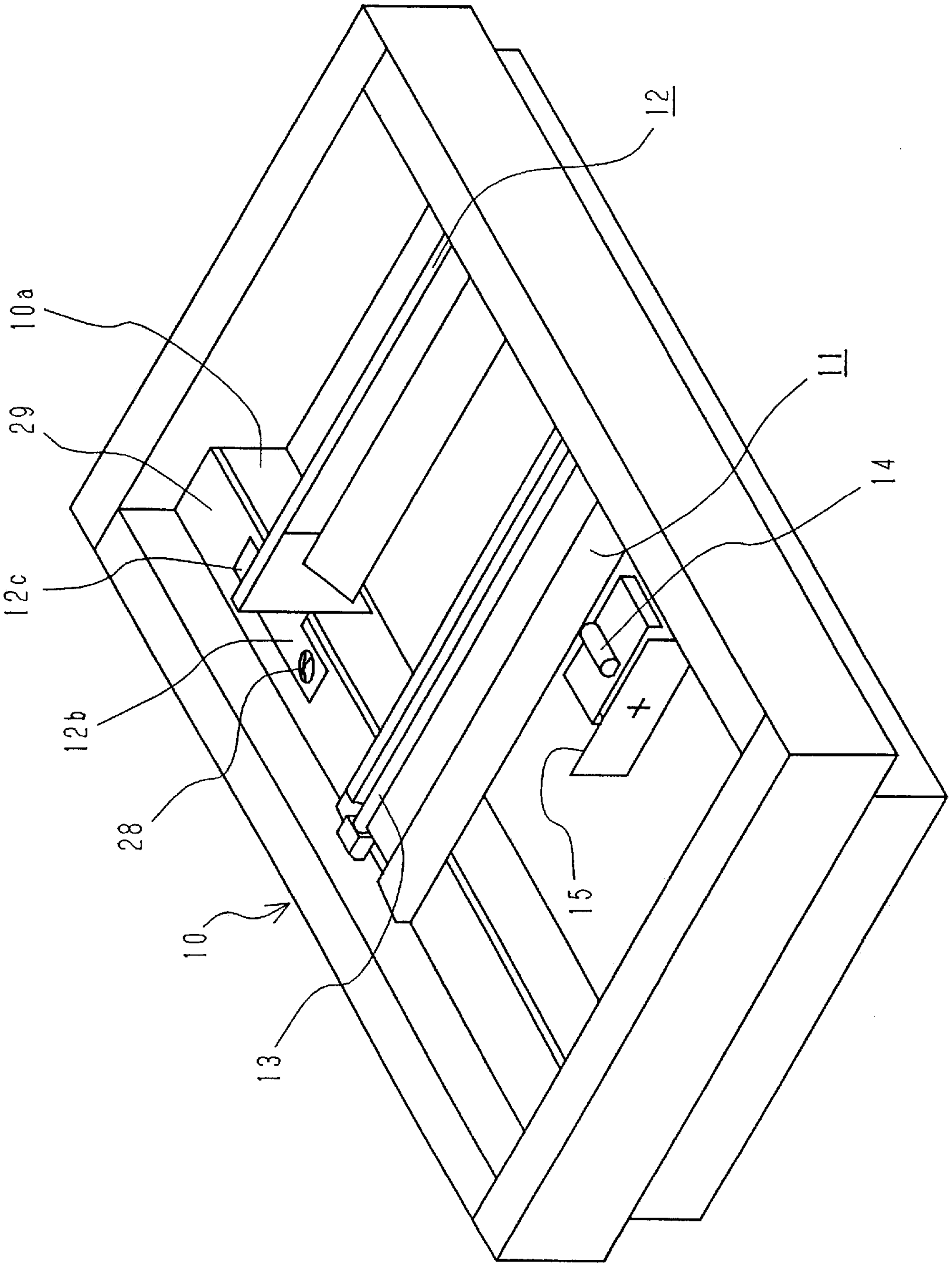
FIG. 2 is a perspective view schematically showing an image processor including a driving mechanism for a carrier adapted to be provided with the inventive guiding mechanism.
Figure 3:
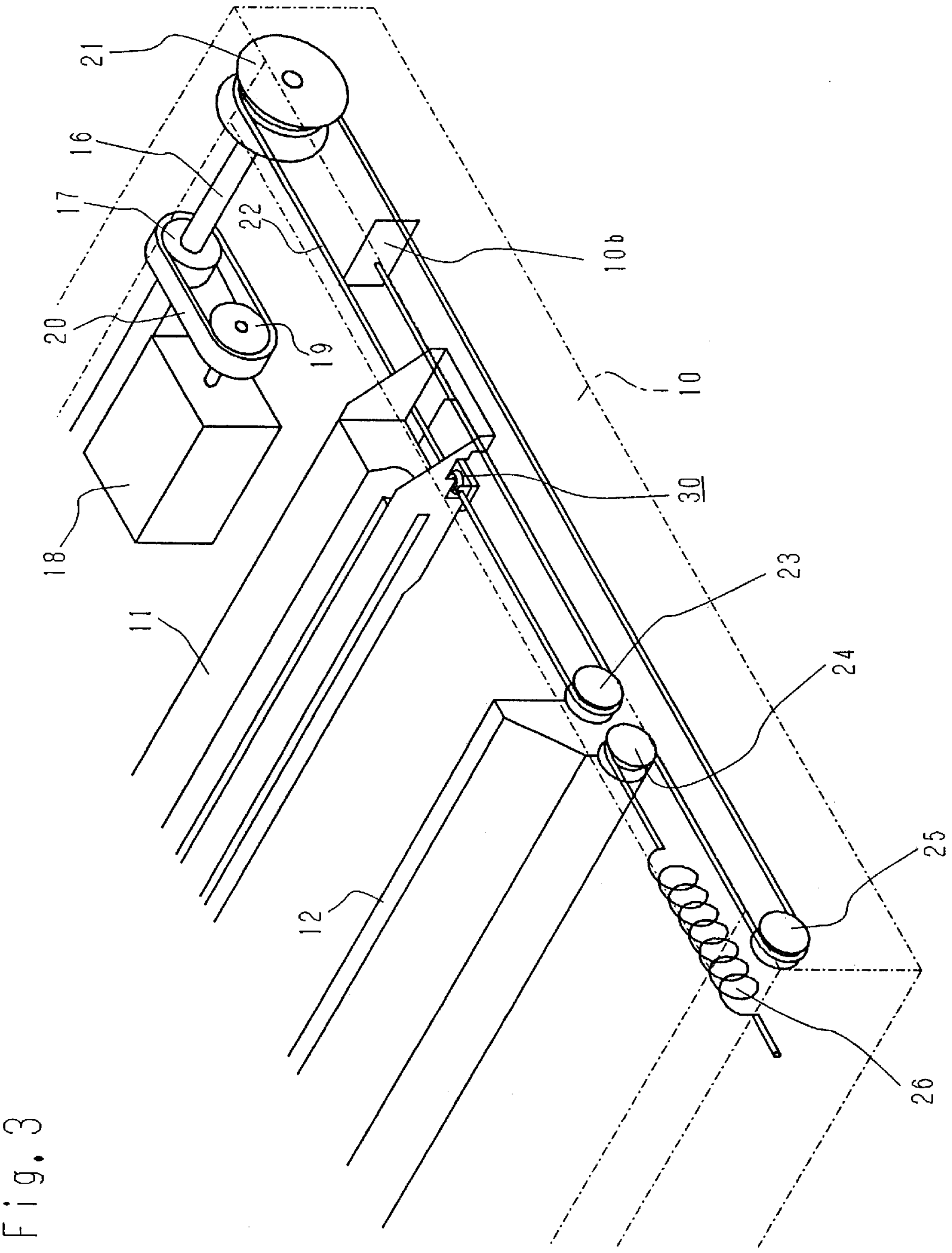
FIG. 3 is a perspective view partially showing the carrier driving mechanism provided with the inventive guiding mechanism.
Figure 4:
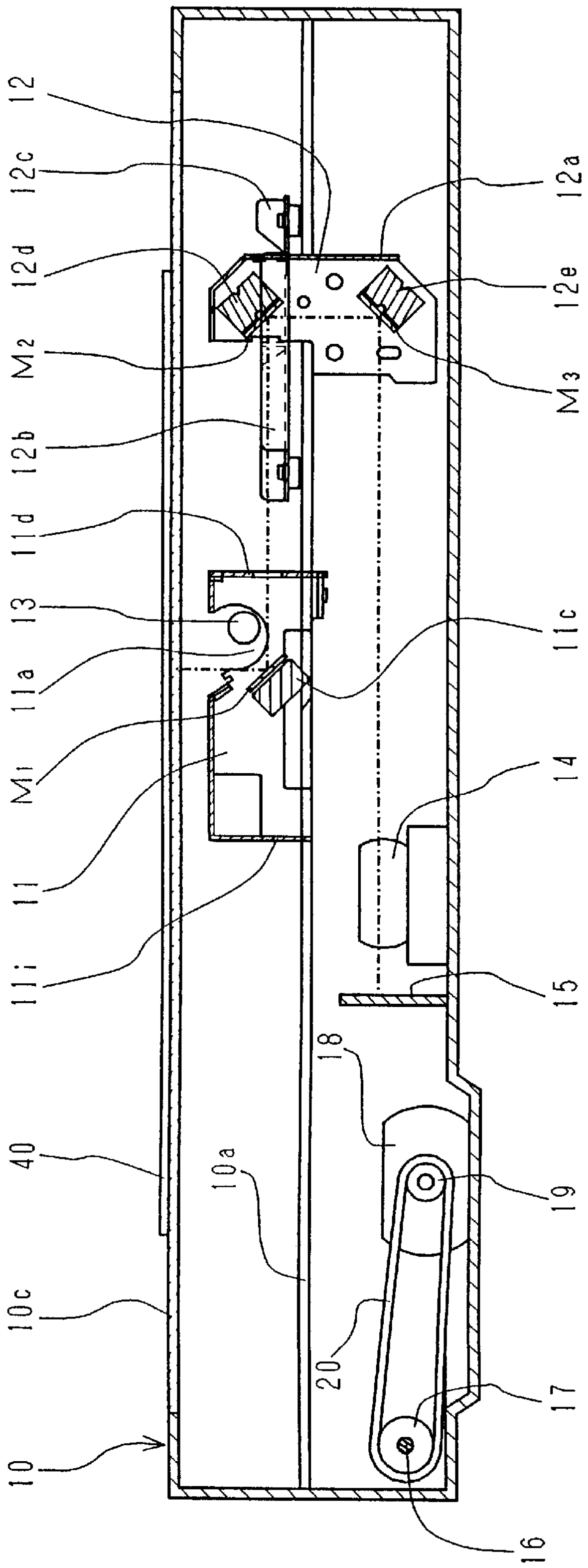
FIG. 4 is a sectional view taken along a vertical plane extending in a scanning direction schematically showing the image processor provided with the inventive guiding mechanism.

FIG. 2 is a schematic perspective view of an image processor adapted to be provided with the inventive guiding mechanism and FIG. 3 is a schematic perspective view illustrating the carrier driving mechanism. As shown in FIG. 2, a substantially rectangular housing 10 is formed with guide means 10*a* in the form of steps extending inward from respective inner surfaces of transversely opposite side walls of housing 10. Guide means 10*a* extend longitudinally of housing 10 so that a first carrier 11 and a second carrier 12 placed on guide means 10*a* may be slidably moved thereon. As shown in FIG. 4, first carrier 11 is provided with a reflector M1 and second carrier 12 is provided with reflectors M2 and M3 so as to define an optical path serving to direct an image of an original 40, which is placed on transparent plate glass 10*c* supported on the upper end of housing 10, to a lens 14. The image transmitted through lens 14 is focused on a CCD 15 serving as an image processing station comprising various elements such as a pick-up element, and thereby processed.

The image is read from the original 40 as carriers 11 and 12 move along the original 40 to scan it. During this scanning movement, a predetermined relationship must be maintained between first carrier 11 and second carrier 12 so that a length of an optical path extending from the original 40 to CCD 15 can be maintained constant. FIG. 3 illustrates a mechanism for driving first carrier 11 and second carrier 12. A driving shaft 16 having its axis orthogonal to the scanning direction of carriers 11 and 12, is rotatably supported by one of the longitudinally opposite ends of housing 10. Driving shaft 16 is provided at its longitudinal middle with a driven pulley 17 fixed thereon. A loop of driving belt 20 is draped on driven pulley 17, on one end, and on a driving pulley 19 fixed around an output shaft of an electric motor 18, on the other end. Driving shaft 16 carries take-up pulleys 21 on its longitudinally opposite ends that are adapted to be rotated together with driving shaft 16. An intermediate length of wire 22 is wound on each of pulleys 21 by an appropriate number of turns. A pair of guide pulleys 23 and 24 arranged side by side in the scanning direction are supported by second carrier 12 rotatably around their axes orthogonal to the scanning direction on each of the longitudinally opposite end surfaces of carrier 12. At an end of housing 10 opposite to the end that is rotatably supporting driving shaft 16, guide pulleys 25 are supported by housing 10 rotatably around their axes orthogonal to the scanning direction. The respective side walls of housing 10 are provided at appropriate locations with brackets 10*b*. It should be understood that the respective pairs of take-up pulleys 21; wire 22; guide pulleys 23, 24, 25; and brackets 10*b* are arranged within housing 10 so as to be mutually opposed with a scanning zone therebetween.

Intermediate length of wire 22 wound on take-up pulley 21 has one end passing through means 30 that is operatively associated with first carrier 11, then through guide pulley 23 and anchored on bracket 10*b*. The other end of wire 22 successively passes through guide pulley 25 and 24 and is anchored on a side of housing 10 with interposition of elastic means 26 such as a tension coil spring.

Figure 5:
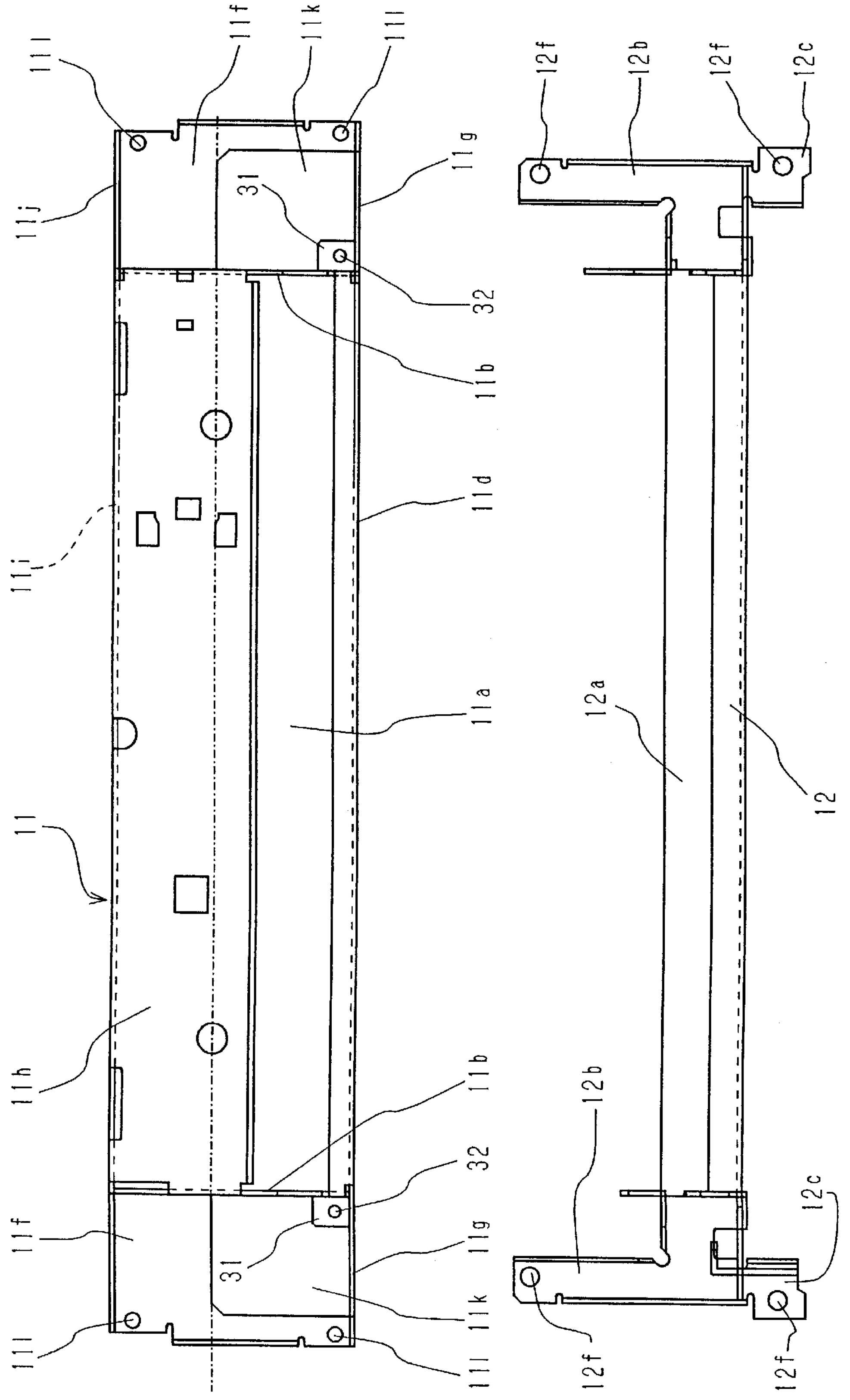
FIG. 5 is a plan view of the carrier assembly adapted to be provided with the inventive guiding mechanism, showing first and second carriers in combination with each other.
Figure 6:
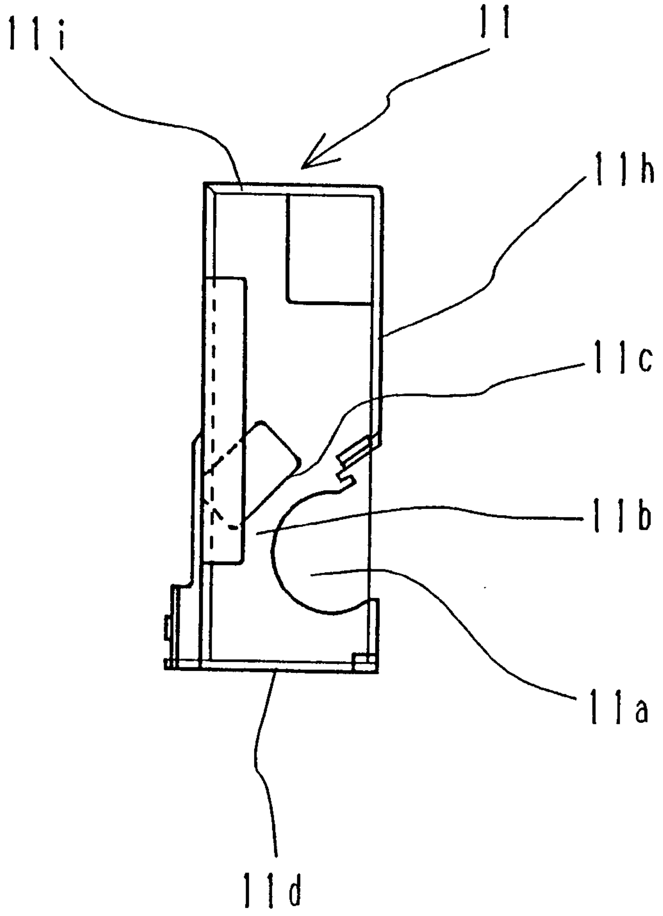
FIG. 6 is a left side view showing the first carrier of the carrier assembly adapted to be provided with the inventive guiding mechanism.
Figure 7:
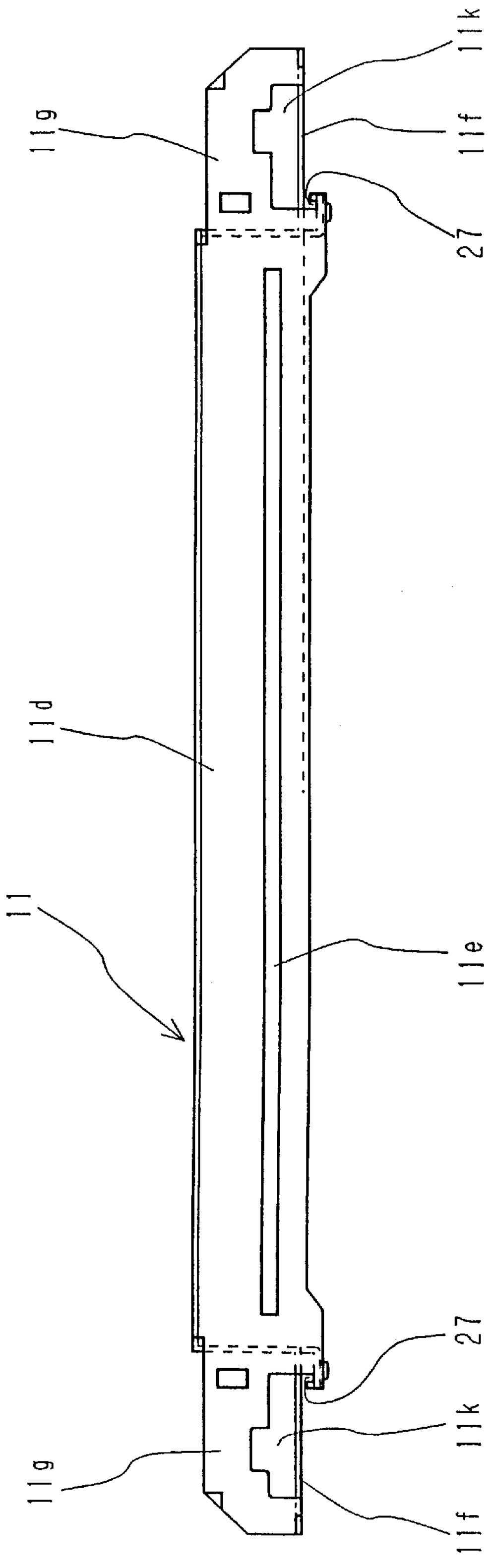
FIG. 7 is a front view showing the first carrier of the carrier assembly adapted to be provided with the inventive guiding mechanism.

FIG. 5 is a plan view of a casing for first carrier 11 and second carrier 12. FIGS. 6 and 7 are a left side view and a front view of first carrier 11, respectively.

An upper portion of first carrier 11 includes a groove 11*a* extending transversely of the scanning direction. A lamp 13 is provided within groove 11*a* to illuminate the image of the original 40, as shown in FIG. 2. Groove 11*a* extends between opposite side walls 11*b* used to suspend lamp 13. Obliquely below groove 11*a*, is a holder 11*c* for reflector M1, as shown in FIG. 6. A slit 11*e* is provided in rear wall 11*d* of groove 11*a*, as shown in FIG. 7, so that light rays are reflected by reflector M1 through slit 11*e* to reflector M2 provided in second carrier 12, as shown in FIG. 4. A bottom plate of the groove extends outward beyond each of side walls 11*b* to define a bottom plate section 11*f*. Rear wall 11*d* also extends outward beyond each of side walls 11*b* so as to define a reinforcing wall section 11*g* for the associated bottom plate section 11*f*. In front of groove 11*a*, a casing 11*h* is provided that contains therein a control unit such as a control circuit. A front wall 11*i* defining casing 11*h* also has lateral extensions serving as reinforcing wall sections 11*j* for the respective bottom plate sections 11*f*. Each of the longitudinally opposite ends of first carrier 11 further include an opening 11*k* extending from the lower edge of reinforcing wall section 11*g* partially into bottom plate section 11*f*. The lower end of rear wall section 11*d* slightly extends into opening 11*k* in the form of an arm having its upper side cut to form retainer means 27. Bottom plate section 11*f* additionally has holes 11*l* formed at its outer corners that serve to hold respective pedestals, which are described below.

Figure 8:
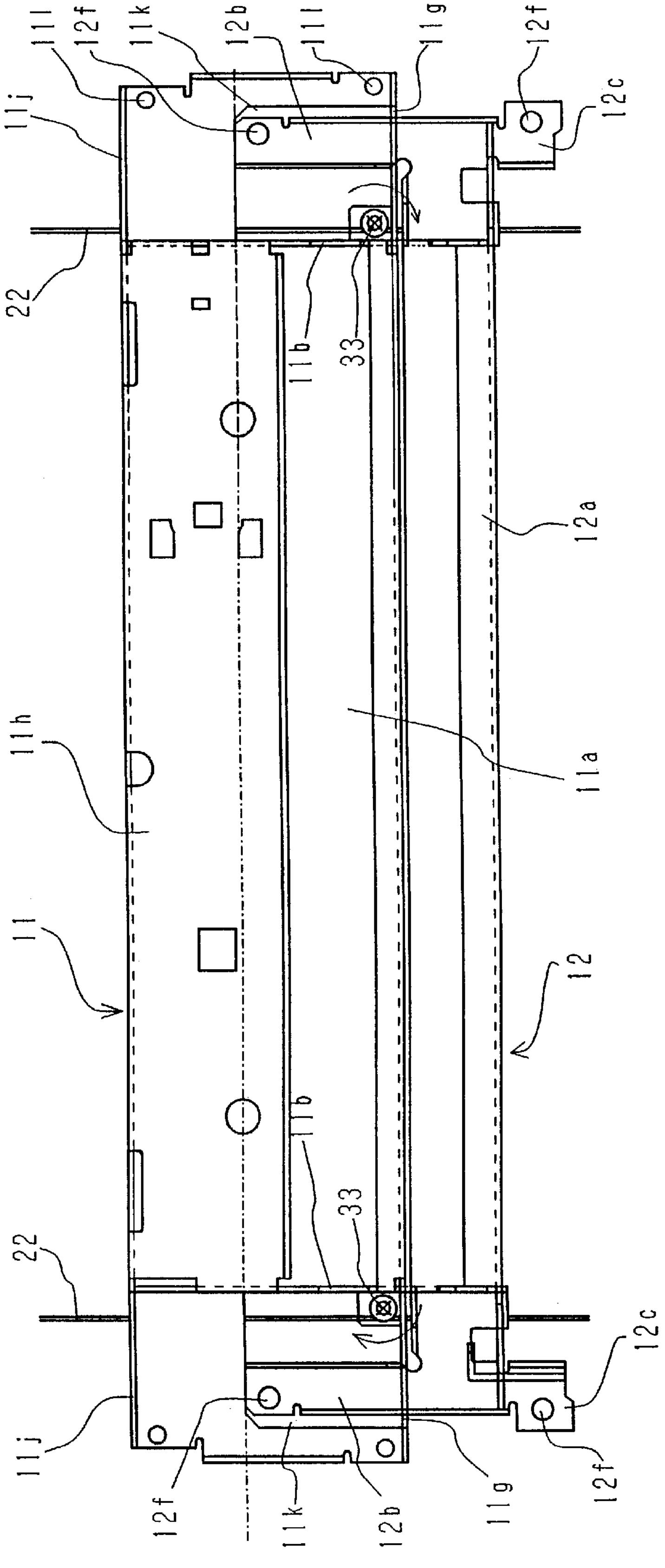
FIG. 8 is a plan view of a carrier assembly adapted to be provided with the inventive guiding mechanism, showing the first and second carriers in their initial positions.

As shown in FIGS. 5 and 8, bottom plate section 11*f* is provided with a bed plate 31 horizontally extending from an edge of opening 11*k* into opening 11*k* in proximity of retainer means 27. A threaded hole 32 forming part of clamping means 30, is cut in bed plate 31. A set screw 33 is threaded into threaded hole 32, as shown in FIG. 8. Set screw 33 is turned to clamp wire 22 between the head of set screw 33 and bed plate 31. When a right-handed screw is employed as set screw 33, wire 22 is positioned relative to set screw 33 so that wire 22 may be pulled by a clamping force of set screw 33, as will be understood from FIG. 8. In other words, wire 22 may be laid on the left side of set screw 33 as viewed in the scanning direction of the carriers 11 and 12 (i.e., in the upward direction as viewed in FIG. 8) and set screw 33 may be turned in a direction indicated by the arrow shown in FIG. 8 to pull wire 22 toward set screw 33. A direction in which the pulled length of wire 22 reacts corresponds to a direction in which first carrier 11 is driven toward second carrier 12.

Retainer means 27 is formed so as to lie on a position appropriately offset relative to a straight line which extends tangentially to set screw 33 on the side of wire 22 and in parallel to the scanning direction. More specifically, retainer means 27 is formed at a position appropriately offset rightward relative to threaded hole 32 as will be understood in reference with FIG. 8. As a result, wire 22 is appropriately curved due to insertion in retainer means 27 and is pressed against a side surface of set screw 33 under a restoring force of curved wire 33.

According to the embodiment as has been illustrated and described, first carrier 11 is formed by bending a single sheet material.

Figure 1:
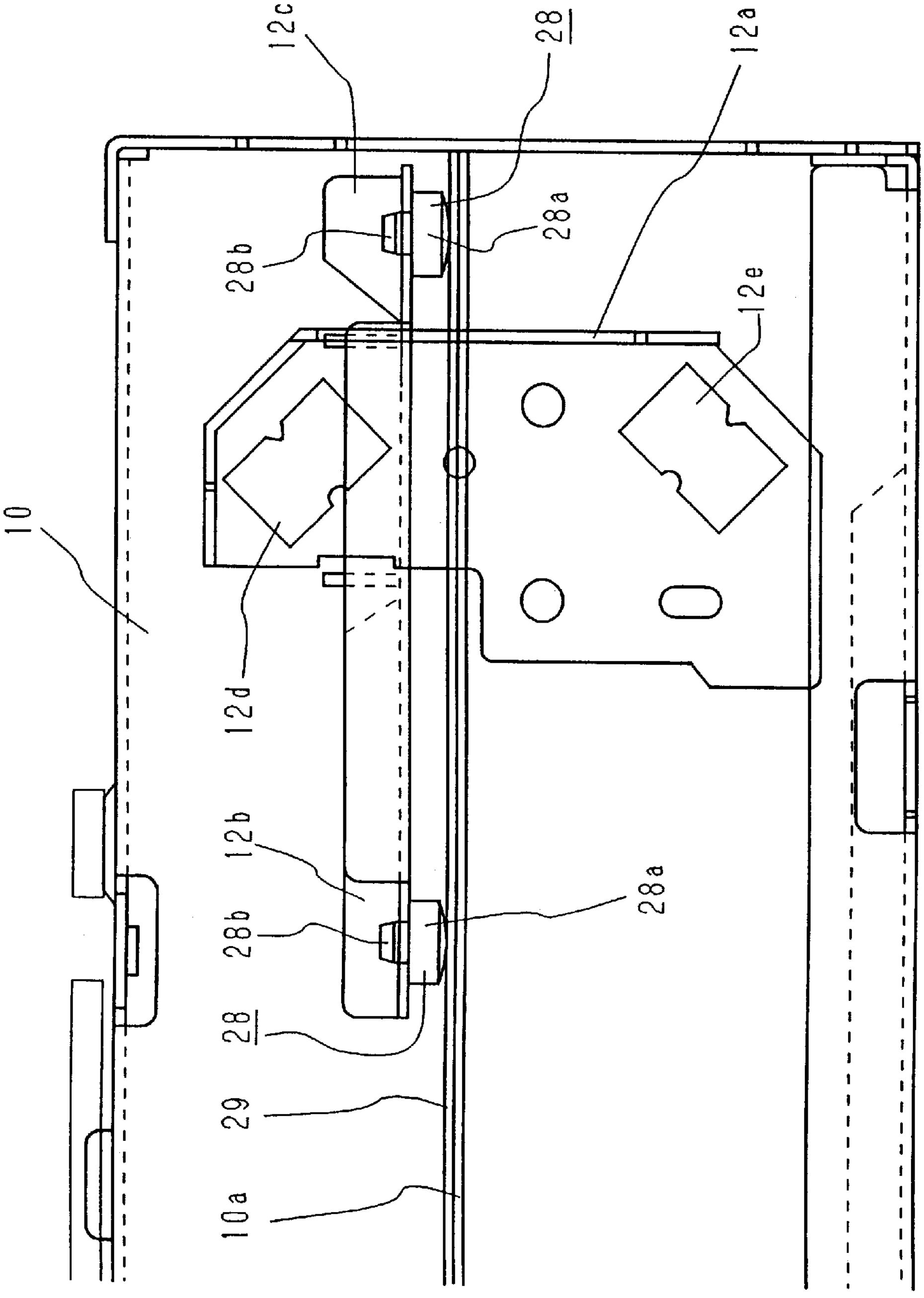
FIG. 1 is a side view showing a carrier guided by the inventive guiding mechanism and guide means for slidable movement of the carrier.

Referring to FIGS. 1, 4, and 5, second carrier 12 contains reflectors M2 and M3 within its main body 12*a*, which is formed at its front and rear ends with a front leg 12*b* and a rear leg 12*c* extending therefrom and rearwardly as viewed in the scanning direction. Main body 12*a* is formed at appropriate positions with a first holder 12*d* and a second holder 12*e* serving to hold reflectors M2 and M3, respectively. As will be apparent from FIG. 4, the image on the original 40 which has been reflected from reflector M1 in first carrier 11 and then passed through slit 11*e*, is then reflected from reflector M2. The image then strikes reflector M3 and is reflected therefrom so as to be directed to lens 14. Front leg 12*b* and rear leg 12*c* are respectively formed with holes 12*f* serving to hold the pedestals which are described in more detail below.

The respective holes 11*e* and 12*f* formed in first carrier 11 and second carrier 12 serve to hold pedestals 28. Referring to FIG. 1, each of these pedestals 28 comprises a foot-like portion 28*a* having a diameter larger than that of hole 12*f* and an ankle-like portion 28*b* destined to be held by hole 12*f*. These foot-like portions 28*a* and ankle-like portions 28*b* may be separately or integrally formed. When they are formed separately of each other, foot-like portion 28*a* may be coupled to ankle-like portion 28*b* after the latter has been fixedly inserted into hole 12*f*. When they are integrally formed, ankle-like portion 28*b* preferably has an elasticity so that ankle-like portion 28*b* may appropriately contract during insertion thereof into hole 12*f* and restore its initial state after insertion thereof. While FIG. 1 illustrates second carrier 12, holes 11*l* formed in first carrier 11 serve also to hold the pedestals in the same manner as in the case of second carrier 12. With carriers 11 and 12 placed on guide means 10*a*, the bottom surfaces of the respective foot-like portions 28*a* come in contact with the top surfaces of the guides.

Foot-like portion 28*a* and/or ankle-like portion 28*b* of pedestal 28 is made of synthetic resin. The top surfaces of guide means 1*a* are also made of synthetic resin. For example, guide plates 29 made of synthetic resin sheet may be laminated on guide means 10*a* forming part of housing 10. Preferably, pedestal 28 is made of synthetic oleo-resin and guide means 10*a* is made of lubricating synthetic resin. According to the specific embodiment described and illustrated herein, pedestal 28 is made of oleo-polyacetal.

The specific embodiment of the inventive guiding means for slidable movement of the carrier in the image processor has been described hereinabove with respect to its construction. The manner in which this embodiment operates is described below in connection with a scanning operation of the carriers 11 and 12.

Scanning by carriers 11 and 12 is carried out as each of take-up pulleys 21 is rotated by actuation of electric motor 18 to take up wire 22 on each of take-up pulleys 21. Rotation of take-up pulleys 21, which is clockwise as viewed in FIG. 3, causes take-up pulley 21 to take up wire 22 and thereby causes first carrier 11 to move toward take-up pulley 21. Second carrier 12 moves one-half of the distance over which first carrier 11 moves since wire 22 passes through guide pulleys 23 associated with second carrier 12 to bracket 10*b* on which wire 22 is anchored. A differential movable distance of travel of first carrier 11 and second carrier 12 is properly adjusted to maintain the predetermined length of the optical path extending from the original 40 to the CCD 15. Carriers 11 and 12 are adapted to move from their initial positions which are remote from take-up pulleys 21.

From the viewpoint of scanning efficiency, first and second carriers 11 and 12 preferably come in contact with each other at their initial positions. This is preferably because, if these two carriers 11 and 12 are spaced from each other at their initial positions, the distance over which first carrier 11 can move will be correspondingly reduced and, as a consequence, the range which can be scanned by first carrier 11 will be limited. In the case of the embodiment herein described in reference with the drawings, first and second carriers 11 and 12 are placed on the same pair of guide plates 29. In order that first and second carriers 11 and 12 can come in contact with each other at their initial positions, this embodiment is so arranged that front leg 12*b* of second carrier 12 is inserted into opening 11*k* formed in first carrier 11 at their initial positions, as shown in FIG. 8.

During movement of carriers 11 and 12, the lowermost surfaces of foot-like portions 28*a* forming part of pedestals 28 slidably move on guide plate 29, which is laminated on guide means 10*a*. These contacting surfaces are made of synthetic resin, particularly of oleo-polyacetal and lubricating synthetic resin, so a frictional force generated between them is not significant. Such low frictional force allows carriers 11 and 12 to be smoothly moved and minimizes vibration of carriers 11 and 12 otherwise generated during the slidable movement thereof.

As will be apparent from the foregoing description, the inventive guiding mechanism for slidable movement of the carriers adopts the contacting surfaces made of synthetic resin and thereby effectively reduces the frictional force in comparison with the case in which the contacting surfaces are made of metallic material. In this way, the carriers can be smoothly moved and vibration otherwise generated during their slidable movement can be minimized without use of a magnet.

The inventive guiding mechanism enables the frictional force to be further reduced by employing oleo- and/or lubricating synthetic resin, thereby making the smoothly slidable and vibrationless movement of the carriers further reliable.

Even when one of the contacting surfaces is made of metallic material and the other is made of synthetic resin according to the invention, a frictional force generated between these contacting surfaces is substantially lower than the case in which both of the contacting surfaces are made of metallic material and the carriers can be smoothly moved.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An image processor comprising:

a main body;

an image processing unit for processing an image of a scanned original;

a carrier being movable from an initial position to a predetermined position in order to scan the original and thereby to direct an image of the original to said image processing unit, said carrier including at least one pedestal having a contacting surface; and guide means provided internally of said main body and having a top surface for contacting said contacting surface of said pedestal and thereby allowing said carrier to be slidably moved thereon from said initial position to said predetermined position so that said carrier may scan the original, wherein said top surface of said guide means is made of synthetic resin, and said contacting surface of said pedestal is made of synthetic resin.

2. The image processor according to claim 1, wherein one of said contacting surface of said pedestal and said top surface of said guide means is made of oleo-synthetic resin and the other is made of lubricating synthetic resin.

3. The image processor according to claim 2, wherein said contacting surface of said pedestal is made of oleo-polyacetal.

4. The image processor according to claim 1, wherein said contacting surface of said pedestal is made of oleo-polyacetal.

5. The image processor according to claim 1, wherein said carrier includes a plurality of said pedestals.

6. The image processor according to claim 1 and further including a second carrier also including at least one pedestal having a contacting surface for slidably contacting said top surface of said guide means.

7. An image processor comprising:

a main body;

an image processing unit for processing an image of a scanned original;

a carrier being movable from an initial position to a predetermined position in order to scan the original and thereby to direct an image of the original to said image processing unit, said carrier including at least one pedestal having a contacting surface; and guide means provided internally of said main body and having a top surface for contacting said contacting surface of said pedestal and thereby allowing said carrier to be slidably moved thereon from said initial position to said predetermined position so that said carrier may scan the original, wherein said top surface of said guide means is made of lubricating synthetic resin and said contacting surface of said pedestal is made of oleo-synthetic resin.

* * * * *